(12) United States Patent
Meng

(10) Patent No.: US 9,639,308 B2
(45) Date of Patent: May 2, 2017

(54) PAGE PROCESSING METHOD AND APPARATUS FOR VARIABLE DATA PRINTING

(71) Applicants: Peking University Founder Group Co., Ltd., Beijing (CN); Founder Information Industry Holdings Co., Ltd., Beijing (CN); Beijing Founder Electronics Co., Ltd., Beijing (CN)

(72) Inventor: Zhangwei Meng, Beijing (CN)

(73) Assignees: PEKING UNIVERSITY FOUNDER GROUP CO., LTD., Beijing (CN); FOUNDER INFORMATION INDUSTRY HOLDINGS CO., LTD, Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 0 days.

(21) Appl. No.: 14/908,793

(22) PCT Filed: Dec. 5, 2013

(86) PCT No.: PCT/CN2013/088615
§ 371 (c)(1),
(2) Date: Jan. 29, 2016

(87) PCT Pub. No.: WO2015/014060
PCT Pub. Date: Feb. 5, 2015

(65) Prior Publication Data
US 2016/0170696 A1    Jun. 16, 2016

(30) Foreign Application Priority Data

Jul. 31, 2013  (CN) .......................... 2013 1 0329140

(51) Int. Cl.
    G06K 15/00    (2006.01)
    G06F 3/12     (2006.01)
    G06K 15/02    (2006.01)
(52) U.S. Cl.
    CPC ............ G06F 3/1243 (2013.01); G06F 3/122 (2013.01); G06F 3/1215 (2013.01);
    (Continued)
(58) Field of Classification Search
    None
    See application file for complete search history.

(56) References Cited

U.S. PATENT DOCUMENTS 5,562,351 A * 10/1996 Uematsu .................... B41J 5/30
                                                    358/1.17
6,446,100 B1 * 9/2002 Warmus .................. B41F 17/02
                                                    715/246

(Continued)

FOREIGN PATENT DOCUMENTS

CN    101576995 A    11/2009
CN    102446163 A    5/2012

(Continued)

OTHER PUBLICATIONS

Japanese Office Action for JP 2016-530310, dated Feb. 7, 2017 with Translation.

*Primary Examiner* — Dung Tran
(74) *Attorney, Agent, or Firm* — Brinks Gilson & Lione

(57) ABSTRACT

This invention relates to printing, and discloses a method and apparatus for variable data printing. The method comprises: obtaining a current page of a file to be printed; performing a rasterization process on the current page to obtain a current page dot matrix; determining a reference page for the current page and obtaining a reference page dot matrix corresponding to the reference page; dividing the reference page dot matrix and the current page dot matrix (Continued)

into dot matrix blocks having a predetermined granularity; identifying variable data blocks in the current page dot matrix based on the dot matrix blocks; dynamically adjusting the size of the variable data blocks; extracting a variable data dot matrix in the current page dot matrix splitting the current page dot matrix up into the reference page dot matrix and the variable data dot matrix and then storing and outputting them.

16 Claims, 7 Drawing Sheets

(52) U.S. Cl.
CPC ......... *G06F 3/1247* (2013.01); *G06K 15/027* (2013.01); *G06K 15/1889* (2013.01); *G06K 15/1886* (2013.01)

(56) References Cited

U.S. PATENT DOCUMENTS

| | | | |
|---|---|---|---|
| 7,315,979 B1* | 1/2008 | Walker | G06T 11/60 358/1.1 |
| 7,456,990 B2* | 11/2008 | Gauthier | G06K 15/00 358/1.15 |
| 2005/0168780 A1* | 8/2005 | Kobashi | G06F 17/248 358/1.18 |
| 2008/0018922 A1* | 1/2008 | Tanaka | H04N 1/32133 358/1.11 |
| 2008/0074685 A1* | 3/2008 | Sakamoto | H04N 1/6072 358/1.9 |
| 2010/0122158 A1* | 5/2010 | Tarumi | G06F 17/211 715/243 |
| 2012/0066588 A1* | 3/2012 | Tokunaga | G06F 17/211 715/244 |
| 2012/0072827 A1* | 3/2012 | Isobe | G06F 3/1211 715/234 |
| 2012/0127514 A1 | 5/2012 | Gloukhenki et al. | |
| 2014/0211229 A1* | 7/2014 | Segawa | G06F 3/1208 358/1.13 |

FOREIGN PATENT DOCUMENTS

| | | |
|---|---|---|
| CN | 103095964 A | 5/2013 |
| JP | 2001/320577 A | 11/2001 |
| JP | 2009/172913 A | 8/2009 |
| JP | 2009/239353 A | 10/2009 |
| JP | 2012098933 A | 5/2012 |
| JP | 2014/186211 A | 10/2014 |

* cited by examiner

PAGE PROCESSING METHOD AND APPARATUS FOR VARIABLE DATA PRINTING

CROSS-REFERENCE TO RELATED APPLICATIONS

This application is a national application of PCT/CN2013/088615, filed on Dec. 5, 2013, which application claims a right of priority to Chinese Patent Application No. 201310329140.9, filed Jul. 31, 2013, both of which are incorporated herein by reference in their entirety.

TECHNICAL FIELD

This invention relates to the field of printing technology, and particularly, to a page processing method and apparatus for variable data printing.

DESCRIPTION OF THE RELATED ART

Variable Data Printing (VDP) has been increasingly applied in a wide variety of fields such as financial, postal, telecommunication, packaging industries and the like. VDP is featured by customized variations in content, i.e., the content to be printed varies among pages. The most typical variable contents are barcodes (one-dimensional and two-dimensional barcodes), variable text (such as names, addresses, dates, serial numbers, postcodes, etc.) and variable images (such as trademarks, logos, etc.). The information for these variable contents is generally stored in various databases. In printing, by using VDP editing software, a user may compose a page template, in which all static page elements are arranged, while specifying by dynamic page elements binding relationships with corresponding fields in the databases and their actual printing output timing. According to the binding relationships, dynamically varied pages are generated, so as to finally realize variable data printing. Thus, the typical pattern of VDP jobs is to use a combination of templates with databases, especially, in the case of mass variable data printing. One VDP job may comprise tens of thousands or even hundreds of thousands of variable data pages.

The Raster Image Processor (RIP) is an interpreter, which is used to interpret and convert page information described in a page description language into data information (generally, bitmaps) that may be outputted from output devices. RIP is considered as the core software in the entire printing industry, and the output quality, output speed and openness of a desktop system depend on the performance of the RIP to a large extent.

Currently, as a basic job outputting manner commonly adopted in the field of digital printing technology, firstly, a VDP job is processed by the RIP and dot matrix data of all pages are compressed and stored on a disk after the rasterization process, then a printing controller in an outputting device reads out dot matrix data of those pages from the disk, decompresses it to flattened dot matrix data and transmits it to a digital printer.

In view of the characteristic of VDP jobs, pages are generally stored for variable data printing in such a manner that each page of a sequence of page dot matrixes is partitioned into reusable dot matrix blocks and variable dot matrix blocks.

VDP jobs comprise single-template jobs and multi-template jobs. The single-template job has a minimum interval of 1 between similar pages, and the multi-template job has a minimum interval of n between similar pages, wherein, n is the number of templates (in the case that the number of templates is 1, it becomes a single-template job).

With a single-template job as an example, the job is composed like (P1, P2, P3, . . . , Pn), wherein P1, P2, P3, . . . , Pn share one template page.

Dot matrix X1 of page P1 is used as reusable data dot matrix blocks (a complete page); dot matrix X2 of page P2=X1 (reusable data dot matrix blocks)+$\Delta X21$ (a set of different dot matrix blocks between X2 and X1), $\Delta X21$ covering corresponding areas in X1.

In the prior art, $\Delta X21$ is extracted by partitioning dot matrixes X1, X2 into a number of dot matrix blocks according to the same rule. Dot matrix blocks having different contents at the same position are classified into $\Delta X21$.

The blocking scheme is to divide a dot matrix of a page into a number of blocks having the same size of a fixed length and a fixed width. However, this scheme has the following drawback: if the size of the divided block is too small, there are too many variable data dot matrix blocks for each of which it is necessary to provide respective attribute data, causing too much space occupied by the block attribute data; if the size of the divided block is too large, although fewer variable data dot matrix blocks are obtained, those blocks have only a small proportion of effective variable data, and it is necessary to store a large amount of ineffective data that may be deleted.

SUMMARY OF THE INVENTION

In view of the drawbacks in the prior art, the present invention provides a page processing method and apparatus for variable data printing in order to save storage space.

A page processing method for variable data printing is provided, the method comprising:

obtaining a current page of a file to be printed;

performing a rasterization process on the current page to obtain a current page dot matrix;

determining a reference page for the current page and obtaining a reference page dot matrix corresponding to the reference page;

dividing the reference page dot matrix and the current page dot matrix into dot matrix blocks having a predetermined granularity according to fixed length and width values;

identifying variable data blocks in the current page dot matrix based on the dot matrix blocks;

dynamically adjusting the size of the variable data blocks;

extracting a variable data dot matrix in the current page dot matrix with respect to the reference page dot matrix, according to the adjusted variable data blocks;

splitting the current page dot matrix up into the reference page dot matrix and the variable data dot matrix and then storing and outputting them.

Preferably, the method further comprises:

before determining a reference page for the current page, determining whether the current page is a reference page;

if the current page is a reference page, adding the current page into a reference page list as a reference page, and adopting the current page dot matrix as the reference page dot matrix and storing the reference page dot matrix in a reference page memory;

if the current page is not a reference page, executing the step of determining a reference page for the current page.

Optionally, the step of determining whether the current page is a reference page comprises:
obtaining a sequence number of the current page;
if the sequence number of the current page is the same as a sequence number of a predetermined reference page, determining that the current page is a reference page.

Optionally, the step of determining whether the current page is a reference page comprises:
if the current page is a first page, determining that the current page is a reference page;
if the current page is not a first page:
sequentially calculating a similarity between the current page and each reference page in the reference page list,
using the current reference page as the reference page for the current page and ending the calculating, when a calculated similarity is larger than a predetermined threshold,
determining the current page as a reference page, when all of the calculated similarities are less than the threshold.

Preferably, the step of identifying variable data blocks in the current page dot matrix based on the dot matrix blocks comprises:
identifying, in the current page dot matrix, dot matrix blocks having content different from corresponding blocks in the reference page dot matrix;
traversing the dot matrix blocks and generating a Mask dot matrix in which the variable data blocks in the current page dot matrix are identified in the form of a black-white dot matrix.

Preferably, the step of dynamically adjusting the size of the variable data blocks comprises:
sequentially extracting connected components from the Mask dot matrix and recording minimum bounding rectangles of the connected components to obtain a set of rectangles;
performing a joining process on rectangles in the set of rectangles to remove contained or intersected rectangles from the set of rectangles;
performing a splitting and/or merging process on the rectangles according to the number and densities of the rectangles obtained after the joining process.

Preferably, the step of performing a joining process on rectangles in the set of rectangles to remove contained or intersected rectangles comprises:
sorting the rectangles in the set of rectangles in descending order according to their areas and using a rectangle having the largest area as a reference rectangle;
sequentially comparing other rectangles with the reference rectangle respectively;
if the other rectangle is contained in the reference rectangle, removing this other rectangle;
if the other rectangle intersects with the reference rectangle, splitting the rectangle having smaller density.

Preferably, the step of performing a splitting and/or merging process on the rectangles according to the number and densities of the rectangles obtained after the joining process comprises:
counting densities of respective rectangles in the set of rectangles;
sequentially splitting rectangles having densities less than a specified density threshold so that all rectangles obtained after the splitting have densities larger than or equal to the density threshold;
counting the number of the rectangles in the set of rectangles;
if the number is larger than a specified threshold, expanding some of the rectangles in the set of rectangles so as to contain their adjacent rectangles, and then returning to execute the step of performing a joining process on rectangles in the set of rectangles.

A page processing apparatus for variable data printing is provided, which comprises:
a raster image processor for obtaining a current page of a file to be printed, and performing a rasterization process on the current page to obtain a current page dot matrix;
a variable data region extractor for extracting a variable data dot matrix in the current page dot matrix with respect to a reference page dot matrix and dynamically adjusting the variable data dot matrix during the extracting process;
a page outputting manager for splitting the current page dot matrix up into the reference page dot matrix and the variable data dot matrix and then outputting and storing them,
wherein the variable data region extractor comprises: a reference page memory, a reference page manager and a separator,
wherein the reference page memory is configured to buffer the reference page dot matrix;
the reference page manager is configured to determine a reference page for the current page;
the separator comprises:
an obtaining unit for obtaining a reference page dot matrix corresponding to the reference page from the reference page memory;
a dividing unit for dividing the reference page dot matrix and the current page dot matrix into dot matrix blocks having a predetermined granularity according to fixed length and width values;
an identification unit for identifying variable data blocks in the current page dot matrix based on the dot matrix blocks;
an adjustment unit for dynamically adjusting the size of the variable data blocks;
an extraction unit for extracting a variable data dot matrix in the current page dot matrix with respect to the reference page dot matrix according to the adjusted variable data blocks.

Preferably, the variable data region extractor further comprises:
a reference page detector configured for, before the reference page manager determines a reference page for the current page, determining whether the current page is a reference page; if the current page is a reference page, adding the current page into a reference page list as a reference page and adopting the current page dot matrix as the reference page dot matrix and storing the reference page dot matrix in the reference page memory; if the current page is not a reference page, instructing the reference page manager to determine a reference page for the current page.

Optionally, the reference page detector is configured to obtain a sequence number of the current page, and determine that the current page is a reference page if the sequence number of the current page is the same as a sequence number of a predetermined reference page.

Optionally, the reference page detector is configured to: if the current page is a first page, determine that the current page is a reference page; and if the current page is not a first page: sequentially calculate a similarity between the current page and each reference page in the reference page list, use the current reference page as the reference page for the current page and end the calculating when a calculated similarity is larger than a predetermined threshold, and determine the current page as a reference page when all of the calculated similarities are less than the threshold.

Preferably, the identification unit is configured to identify, in the current page dot matrix, dot matrix blocks having contents different from corresponding blocks in the reference page dot matrix; traverse the dot matrix blocks and generate a Mask dot matrix in which the variable data blocks in the current page dot matrix are identified in the form of a black-white dot matrix.

Preferably, the adjustment unit comprises:

a connected component extraction unit for sequentially extracting connected components from the Mask dot matrix and recording minimum bounding rectangles of the connected components to obtain a set of rectangles;

a joining unit for performing a joining process on rectangles in the set of rectangles to remove contained or intersected rectangles from the set of rectangles;

a merging unit for performing a splitting and/or merging process on the rectangles according to the number and densities of the rectangles obtained after the joining process.

Preferably, the joining unit comprises:

a sorting unit for sorting the rectangles in the set of rectangles in descending order according to their areas and using a rectangle having the largest area as a reference rectangle;

a comparing unit for sequentially comparing other rectangles with the reference rectangle respectively; if the other rectangle is contained in the reference rectangle, removing this other rectangle; and if the other rectangle intersects with the reference rectangle, splitting the rectangle having smaller density.

Preferably, the merging unit comprises:

a counting unit for counting densities of respective rectangles in the set of rectangles;

a splitting unit for sequentially splitting rectangles having densities less than a specified density threshold so that all rectangles obtained after splitting have densities larger than or equal to the density threshold;

the counting unit is further configured to count the number of the rectangles in the set of rectangles;

an expanding unit for, if the number is larger than a specified threshold, expanding some of the rectangles in the set of rectangles so as to contain their adjacent rectangles, and then instructing the merging unit to perform a joining process on rectangles in the set of rectangles.

With the page processing method and apparatus for variable data printing according to this invention, by dynamically adjusting the size of variable data blocks, an optimal configuration may be effectively realized with respect to the number of variable data blocks and their densities, which may avoid obtaining too many variable data blocks and at the same time guarantee higher densities of variable data in the variable data blocks, so that storage space can be saved effectively and subsequent arrangement of variable data information can be guaranteed.

BRIEF DESCRIPTION OF THE DRAWINGS

To clearly illustrate solutions in the embodiments of the present application, a simple description of accompanying drawings used in the embodiments will be made below. Apparently, drawings to be described below represent merely some embodiments of this invention, from which other drawings may be derived by those skilled in the art.

DETAILED DESCRIPTION OF THE PREFERRED EMBODIMENT

To achieve a better understanding of the solutions of embodiments according to the present invention for those skilled in the art, the embodiments of the present invention will be described in details with reference to the accompanying drawings in the following.

Variable data printing is directed to variable data pages. From the perspective of page composition objects, variable data pages comprise reusable elements and non-reusable elements. From the perspective of finally obtained dot matrix areas of pages, they may be divided into invariable areas and variable areas. Pages are generally stored in such a manner that each page of a sequence of page dot matrixes is split up into reusable data dot matrix blocks and variable data dot matrix blocks.

In view of this, a page processing method and apparatus for variable data printing is provided in embodiments of this invention, in which by dynamically adjusting the size of variable data blocks, an optimal configuration may be effectively realized with respect to the number of variable data blocks and their densities, which may prevent from obtaining too many variable data blocks while guaranteeing higher variable data densities of the variable data blocks, so that storage space may be saved effectively and subsequent arrangement of variable data information may be guaranteed.

Figure 1:
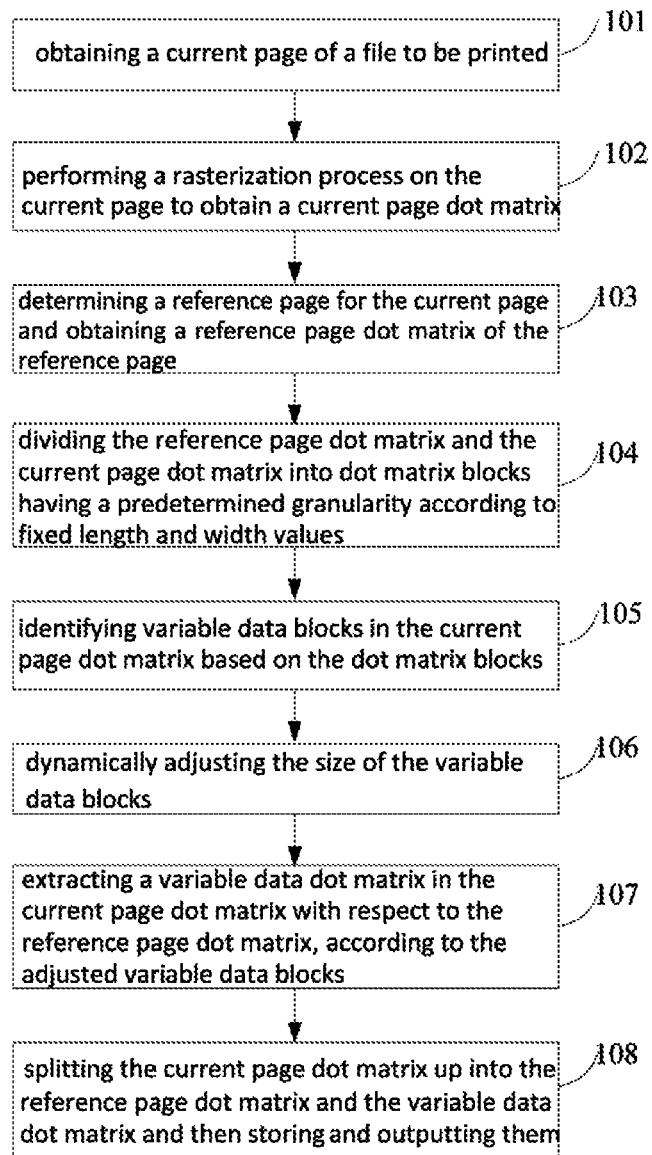
FIG. 1 is a flowchart of a page processing method for variable data printing according to an embodiment of this invention.

As shown in FIG. 1, a page processing method for variable data printing according to an embodiment of this invention comprises the following steps:

Step 101: obtaining a current page of a file to be printed.

Step 102: performing a rasterization process on the current page to obtain a current page dot matrix.

Step 103: determining a reference page for the current page and obtaining a reference page dot matrix of the reference page.

Step 104: dividing the reference page dot matrix and the current page dot matrix into dot matrix blocks having a predetermined granularity according to fixed length and width values.

Step 105: identifying variable data blocks in the current page dot matrix based on the dot matrix blocks.

Particularly, dot matrix blocks having content different from corresponding blocks in the reference page dot matrix may be identified in the current page dot matrix; then the dot matrix blocks are traversed and a Mask dot matrix may be generated in which the variable data blocks in the current page dot matrix are identified in the form of a black-white dot matrix.

For example, 0XFF represents the block having different content from the corresponding block in the reference page, and 0X0 represents the block having the same content with the corresponding block in the reference page. The Mask dot matrix actually shows a distribution of the positions of variable data blocks.

Step 106: dynamically adjusting the size of the variable data blocks.

Step 107: extracting a variable data dot matrix in the current page dot matrix with respect to the reference page dot matrix, according to the adjusted variable data blocks.

Step 108: splitting the current page dot matrix up into the reference page dot matrix and the variable data dot matrix and then storing and outputting them.

Note that, in practical applications, reference pages may be specified in advance, or may be determined through dynamical scanning. In the case of dynamical scanning, each time a current page is obtained, it is necessary to determine whether the page is a reference page. Further, in order to accommodate different VDP job modes, i.e., single-template jobs and multiple-template jobs, one or more than one reference pages may be provided.

For compatibility of various different reference page determination methods and VDP job modes, a reference page list may be provided for storing reference pages. A reference page memory is provided to store reference page dot matrixes corresponding to respective reference pages in the reference page list. Certainly, it is also required to establish a correspondence relationship therebetween and store some necessary attribute parameters.

Correspondingly, in the flow shown in FIG. 1, the following steps may be further comprised between steps 102 and 103:

determining whether the current page is a reference page;

if the current page is a reference page, adding the current page into the reference page list as a reference page, and adopting the current page dot matrix as the reference page dot matrix and storing the reference page dot matrix in the reference page memory;

if the current page is not a reference page, determining a reference page for the current page, i.e., executing the step 103 described above.

As mentioned above, reference pages may be specified in advance or may be determined through dynamical scanning.

For example, one or several pages may be arbitrarily chosen as the reference pages from a file to be printed, so that when it is determined whether a current page is a reference page, it may be determined based on a sequence number of the current page. If the sequence number of the current page is the same as a sequence number of a predetermined reference page, the current page may be determined as a reference page.

As another example, in the case of determining a reference page through dynamical scanning, first, it is determined whether the current page is a first page; if so, it is added to the reference page list as a reference page; otherwise, a similarity between the current page and each reference page in the reference page list are calculated sequentially. If a calculated similarity is larger than a predetermined threshold, a current reference page is used as the reference page for the current page and the calculation is ended; if all the calculated similarities are less than the threshold, the current page is determined as a reference page, and is added to the reference page list.

In the calculation of similarity, pages may be divided into n blocks according to specified length and width values. The similarity between the current page and a reference page is M/N, if there are m blocks having the same data therebetween.

Certainly, in practical applications, it is also possible to determine the reference page in other manners, which is not limited to the embodiments of this invention.

Taking advantage of the page processing method for variable data printing according to the embodiment of this invention, during a VDP job, after variable data blocks are extracted from n blocks having the same size obtained by dividing a page dot matrix according to fixed length and width values, by dynamically adjusting the size of variable data blocks, an optimal configuration may be effectively realized with respect to the number of variable data blocks and their densities, which may prevent too many variable data blocks while guaranteeing higher variable data densities of the variable data blocks, so that storage space may be saved effectively and a subsequent arrangement of variable data information may be guaranteed.

Figure 2:
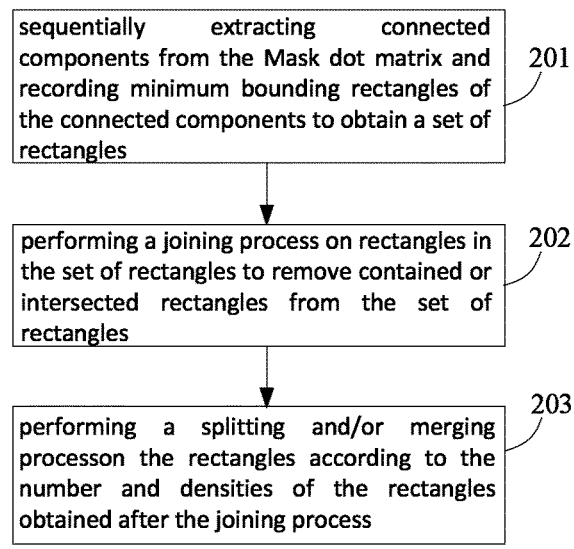
FIG. 2 is a flowchart of dynamically adjusting the size of variable data blocks according to an embodiment of this invention.

As shown in FIG. 2, a flow of dynamically adjusting the size of variable data blocks according to an embodiment of this invention comprises the following steps:

Step 201: sequentially extracting connected components from the Mask dot matrix and recording minimum bounding rectangles of the connected components to obtain a set of rectangles.

Step 202: performing a joining process on rectangles in the set of rectangles to remove contained or intersected rectangles.

The purpose of the joining process is to make the number of the rectangles as few as possible.

Step 203: performing a splitting and/or a merging process according to the number and densities of the rectangles obtained after the joining process.

By the splitting and/or merging process, an optimal configuration may be realized with respect to the number of variable data blocks and their densities. The density of a variable data block means the ratio of the amount of variable data in the block to the total data amount of the block.

Figure 3:
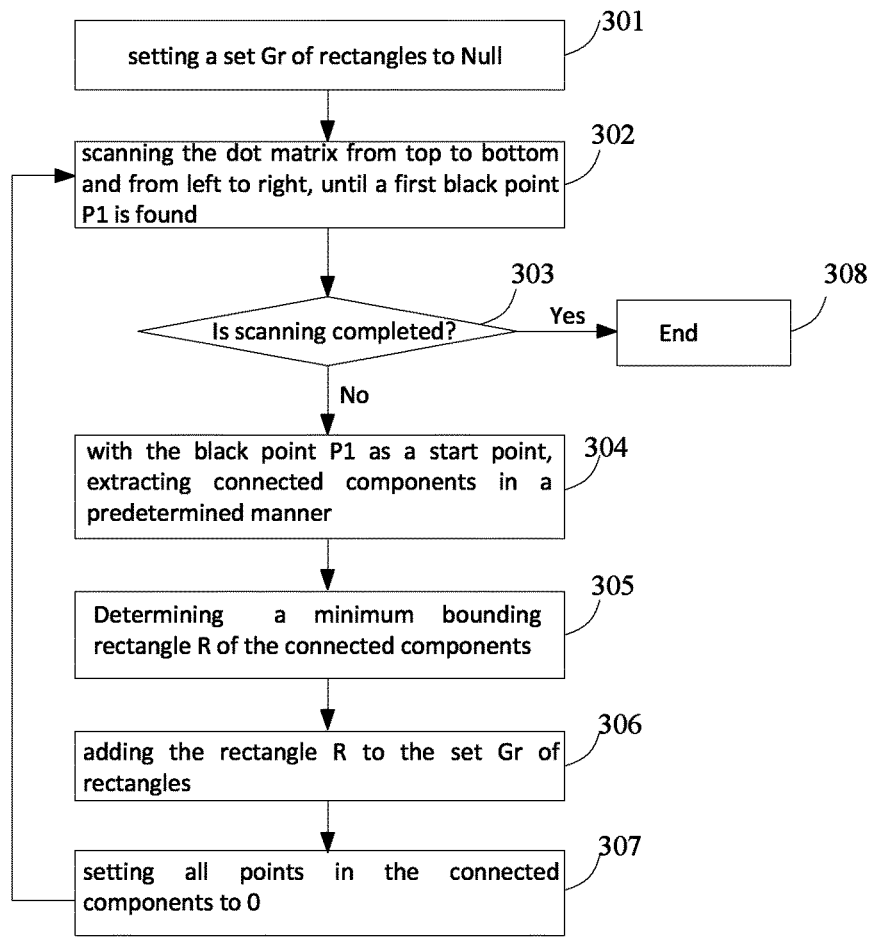
FIG. 3 is a flowchart of extracting connected components from a Mask dot matrix according to an embodiment of this invention.

As shown in FIG. 3, the flow of extracting connected components from a Mask dot matrix according to an embodiment of this invention comprises the following steps:

Step 301: setting a set Gr of rectangles to Null.

Step 302: scanning the dot matrix from top to bottom and from left to right, until a first black point P1 is found.

Step 303: determining whether the scanning is completed; if so, proceeding to step 308; otherwise, proceeding to step 304.

Step 304: with the black point P1 as a start point, extracting connected components in a predetermined manner.

The predetermined manner described above may be the common method in the art, such as 4-adjacency, 8-adjacency or m-adjacency method.

Step 305: determining a minimum bounding rectangle R of the connected components.

Step 306: adding the rectangle R to the set Gr of rectangles.

Step 307: setting all points in the connected components to 0, i.e., changing those points to white points; then returning to step 302 to continue the scanning.

Step 308: end.

Figure 4:
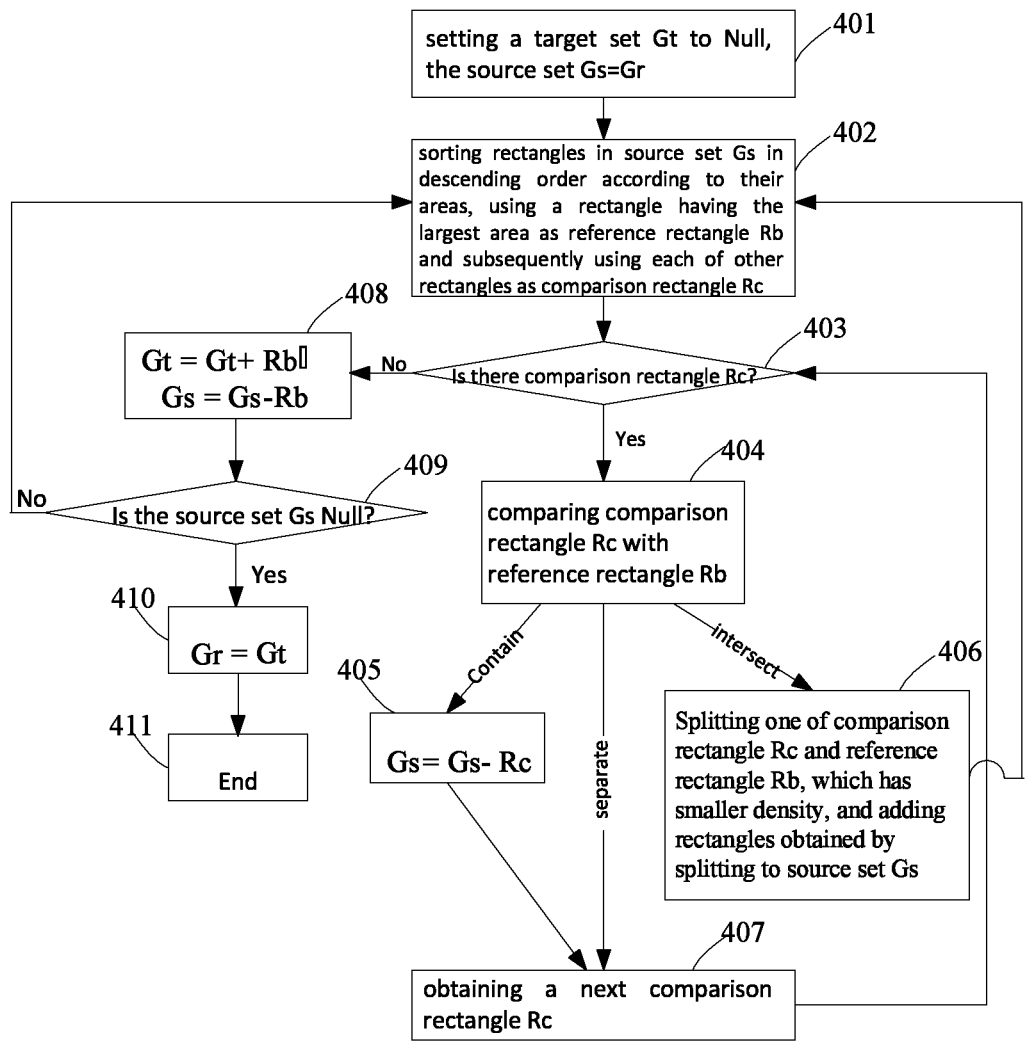
FIG. 4 is a flowchart of joining rectangles in a set of rectangles according to an embodiment of this invention.

As shown in FIG. 4, a flow of joining rectangles in a set of rectangles according to an embodiment of this invention comprises the following steps:

Step 401: setting a target set Gt to Null, the source set Gs=Gr.

The target set is a set of rectangles after the joining process, and the source set is a set of rectangles before the joining process.

Step 402: sorting the rectangles in the source set Gs in descending order according to their areas, using a rectangle having the largest area as a reference rectangle Rb and subsequently using each of other rectangles as a comparison rectangle Rc.

Step 403: determining whether there is a comparison rectangle Rc; if so, proceeding to step 404; otherwise, proceeding to step 408.

Step 404: comparing the comparison rectangle Rc with the reference rectangle Rb. If the comparison rectangle Rc is contained in the reference rectangle Rb, proceeding to step 405; if the comparison rectangle Rc intersects with the reference rectangle Rb, proceeding to step 406; if the comparison rectangle Rc is neither contained in nor intersects with the reference rectangle Rb, proceeding to step 407.

Step 405: Gs=Gs−Rc, removing the comparison rectangle Rc from the source set; then proceeding to step 407.

Step 406: splitting one of the comparison rectangle Rc and the reference rectangle Rb, which has smaller density, and adding rectangles obtained after splitting to the source set Gs; then proceeding to step 402.

Step 407: obtaining a next comparison rectangle Rc; then proceeding to step 403.

Step 408: Gt=Gt+Rb, Gs=Gs−Rb, i.e., obtaining the adjusted target set Gt and the adjusted source set Gs.

Step 409: determining whether the source set Gs is Null; if so, proceeding to step 410; otherwise, proceeding to step 402.

Step 410: Gr=Gt.

Step 411: end.

Figure 5:
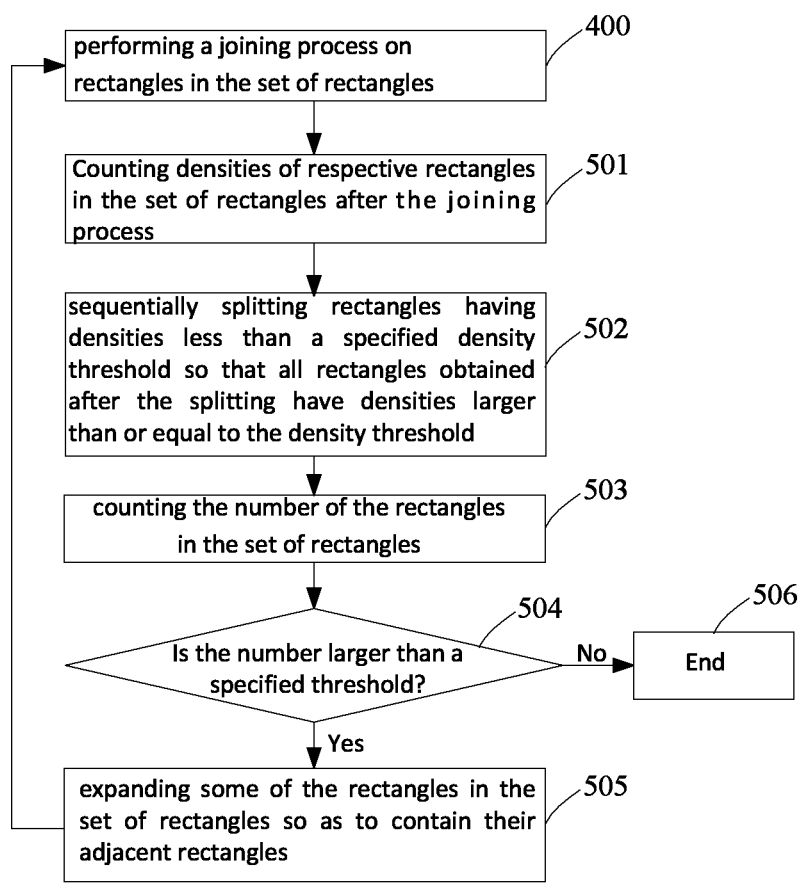
FIG. 5 is a flowchart of performing a splitting and/or merging process on rectangles in a set of rectangles according to an embodiment of this invention.

FIG. 5 shows a flowchart of performing a splitting and/or merging process on rectangles in a set of rectangles according to an embodiment of this invention.

Because the joining process and the splitting and/or merging processes are performed on the rectangles in the set of rectangles in an iterative way, in order to make the description clearer, the joining process performed on the rectangles in the set of rectangles as described above will be shown as a block in the flow shown in FIG. 5, i.e., step 400 shown in FIG. 5.

Step 400: performing the joining process on the rectangles in the set of rectangles.

Step 501: counting densities of respective rectangles in the set of rectangles after the joining process.

Step 502: sequentially splitting rectangles having densities less than a specified density threshold so that all rectangles obtained after splitting have densities larger than or equal to the density threshold.

For example, a rectangle is divided into n*m rectangles according to a length-width ratio, and densities of these divided rectangles are counted respectively. Specifically, rectangles having densities less than the threshold are further split according to a ratio; rectangles having densities of 0 are removed; and rectangles having densities larger than 0 are directly added into the set of rectangles.

Step 503: counting the number of the rectangles in the set of rectangles.

Step 504: determining whether the number is larger than a specified threshold; if so, proceeding to step 505; otherwise, proceeding to step 506.

Step 505: expanding some of the rectangles in the set of rectangles so as to contain their adjacent rectangles, and then proceeding to step 400.

Expanding a rectangle means enlarging the length and width of the rectangle so that the enlarged rectangle contains its adjacent rectangle, in order to reduce the number of the rectangles.

Step 506: end.

Thus, taking advantage of the page processing method for variable data printing according to the embodiment of this invention, during a VDP job, after variable data blocks are extracted from a number of blocks having the same size obtained by dividing a page dot matrix according to fixed length and width values, by dynamically adjusting the size of variable data blocks, an optimal configuration may be effectively realized with respect to the number of variable data blocks and their densities, which may prevent too many variable data blocks while guaranteeing higher variable data densities of the variable data blocks, so that storage space may be saved effectively and a subsequent arrangement of variable data information may be guaranteed.

Figure 6:
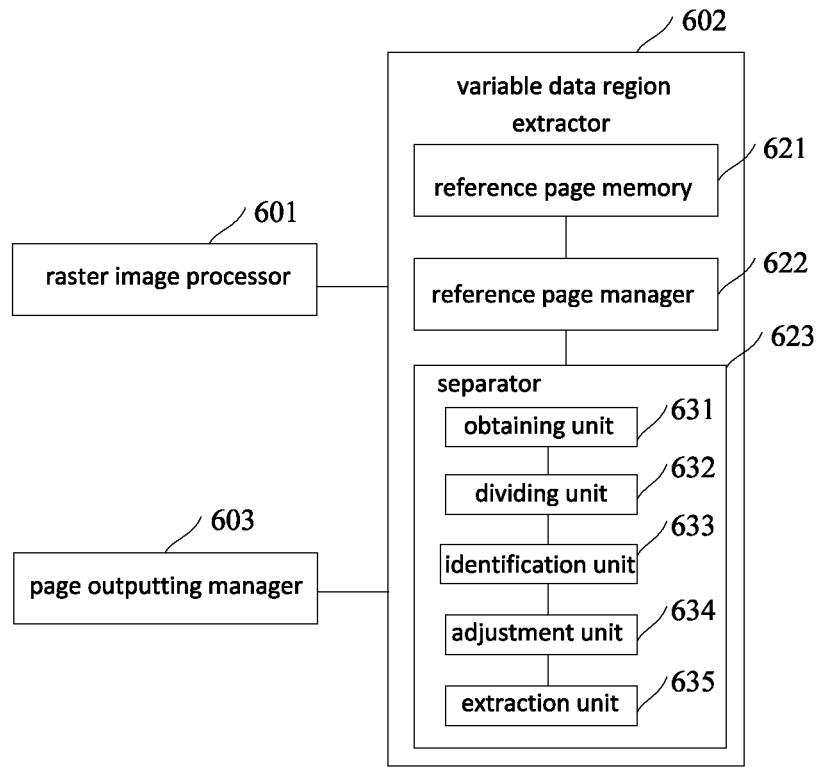
FIG. 6 is a schematic structure diagram of a page processing apparatus for variable data printing according to an embodiment of this invention.

Correspondingly, a page processing apparatus for variable data printing is also provided in an embodiment of this invention. FIG. 6 shows a schematic structure diagram of such apparatus.

In this embodiment, the apparatus comprises:

a raster image processor 601 for obtaining a current page of a file to be printed, and performing a rasterization process on the current page to obtain a current page dot matrix;

a variable data region extractor 602 for extracting a variable data dot matrix in the current page dot matrix with respect to a reference page dot matrix and dynamically adjusting the variable data dot matrix during the extraction process;

a page outputting manager 603 for splitting the current page dot matrix up into the reference page dot matrix and the variable data dot matrix and then outputting and storing them.

The variable data region extractor 602 comprises: a reference page memory 621, a reference page manager 622 and a separator 623.

The reference page memory 621 is configured to buffer the reference page dot matrix.

The reference page manager 622 is configured to determine a reference page for the current page.

The separator 623 comprises:

an obtaining unit 631 for obtaining a reference page dot matrix corresponding to the reference page from the reference page memory;

a dividing unit 632 for dividing the reference page dot matrix and the current page dot matrix into dot matrix blocks having a predetermined granularity according to fixed length and width values;

an identification unit 633 for identifying variable data blocks in the current page dot matrix based on the dot matrix blocks;

an adjustment unit 634 for dynamically adjusting the size of the variable data blocks;

an extraction unit 635 for extracting a variable data dot matrix in the current page dot matrix with respect to the reference page dot matrix according to the adjusted variable data blocks.

Taking advantage of the page processing apparatus for variable data printing according to the embodiment of this invention, during a VDP job, after variable data blocks are extracted from a number of blocks having the same size obtained by dividing a page dot matrix according to fixed length and width values, by dynamically adjusting the size of variable data blocks, an optimal configuration may be effectively realized with respect to the number of variable data blocks and their densities, which may prevent too many variable data blocks while guaranteeing higher variable data densities of the variable data blocks, so that storage space may be saved effectively and a subsequent arrangement of variable data information may be guaranteed.

Note that, in practical applications, the reference page may be specified in advance. For example, any page in the file to be printed can be specified as the reference page. Certainly, the reference page may alternatively be determined by dynamical scanning. In the case of dynamical scanning, each time a current page is obtained, it is necessary to determine whether the page is a reference page. Further, in order to accommodate different VDP job modes, i.e., single-template jobs and multiple-template jobs, one or more than one reference pages may be provided.

For compatibility of various different reference page determination methods and VDP job modes, a reference page list may be provided for storing reference pages. A reference page memory is provided to store reference page dot matrixes corresponding to respective reference pages in the reference page list. Certainly, it is also required to establish a correspondence relationship therebetween and store some necessary attribute parameters. These attribute parameters may be stored in the reference page memory 621.

Thus, in another embodiment of the page processing apparatus for variable data printing according to the present invention, the variable data region extractor 602 further comprises:

a reference page detector (not shown) configured for, before the reference page manager 622 determines a reference page for the current page, determining whether the current page is a reference page; if the current page is a reference page, adding the current page into a reference page list as a reference page and adopting the current page dot matrix as the reference page dot matrix and storing the reference page dot matrix in the reference page memory 621; if the current page is not a reference page, instructing the reference page manager 622 to determine a reference page for the current page.

In practical applications, the reference page detector may determine whether the current page is a reference page in various manners.

For example, the reference page detector may obtain a sequence number of the current page, and determine that the current page is a reference page if the sequence number of the current page is the same as a sequence number of a predetermined reference page.

Alternatively, the reference page detector may be configured to determine that the current page is a reference page if the current page is a first page; and if the current page is not a first page, sequentially calculate a similarity between the current page and each reference page in the reference page list, use the current reference page as the reference page for the current page and end the calculating when a calculated similarity is larger than a predetermined threshold, and determine the current page as a reference page when all of the calculated similarities are less than the threshold.

In this embodiment of the present invention, the identification unit 633 may identify, in the current page dot matrix, dot matrix blocks having contents different from corresponding blocks in the reference page dot matrix; traverse the dot matrix blocks and generate a Mask dot matrix in which the variable data blocks in the current page dot matrix are identified in the form of a black-white dot matrix. Certainly, the identification unit 633 may identify variable data blocks in the current page dot matrix in other manners, which is not limited to the embodiments of this invention.

In the embodiment of this invention, the adjustment unit 634 is configured to dynamically adjust the size of the variable data blocks, so as to realize an optimal configuration with respect to the number of variable data blocks and their densities, which may avoid obtaining too many variable data blocks and at the same guarantee higher variable data densities of the variable data blocks.

Figure 7:
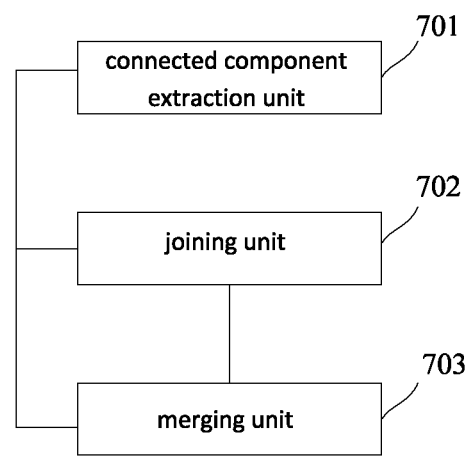
FIG. 7 is a schematic structure diagram of the adjustment unit in the page processing apparatus for variable data printing according to an embodiment of this invention.

FIG. 7 is a schematic structure diagram of the adjustment unit in the page processing apparatus for variable data printing according to an embodiment of this invention.

In this embodiment, the adjustment unit comprises:

a connected component extraction unit 701v for sequentially extracting connected components from the Mask dot matrix and recording minimum bounding rectangles of the connected components to obtain a set of rectangles;

a joining unit 702 for performing a joining process on rectangles in the set of rectangles to remove contained or intersected rectangles from the set of rectangles;

a merging unit 703 for performing a splitting and/or merging process on the rectangles according to the number and densities of the rectangles obtained after the joining process.

The joining unit 702 comprises a sorting unit and a comparing unit (not shown). The sorting unit is configured for sorting the rectangles in the set of rectangles in descending order according to their areas and using a rectangle having the largest area as a reference rectangle. The comparing unit is configured for sequentially comparing each of other rectangles with the reference rectangle respectively; if the other rectangle is contained in the reference rectangle, removing this other rectangle; and if the other rectangle intersects with the reference rectangle, splitting one of the other rectangle and the reference rectangle, which has a smaller density.

Reference can be made to the description of the page processing method for variable data printing provided in the above embodiment for details of the joining process performed on rectangles in the set of rectangles by the joining unit 702, which will not be repeated herein.

The merging unit 703 comprises: a counting unit, a splitting unit and an expanding unit (not shown). The counting unit is configured for counting densities of respective rectangles in the set of rectangles. The splitting unit is configured for sequentially splitting rectangles having densities less than a specified density threshold so that all rectangles obtained after splitting have densities larger than or equal to the density threshold. The counting unit is further configured to count the number of the rectangles in the set of rectangles. The expanding unit is configured for, if the number is larger than a specified threshold, expanding some of the rectangles in the set of rectangles so as to contain their adjacent rectangles, and then instructing the joining unit 702 to perform a joining process on rectangles in the set of rectangles.

Reference can be made to the description of the page processing method for variable data printing provided in the above embodiment for details of the performing the splitting and/or merging process on the rectangles in the set of rectangles by the merging unit 703, which will not be repeated herein.

Below, an example will be given to further explain the procedure of the page processing for variable data printing executed by the apparatus according to the embodiment of this invention.

Assume that the raster image processor 601 adopts a 360*360 dpi output file, which has 5000 pages, with one template. One page has 5952*5536 pixels after rasterization. Assume that the density threshold RDt=90%, the threshold for the number of the variable data blocks is Nt=50.

The specific procedure is as follows:

1. Page P1 is outputted by the following operations:

(1) The raster image processor 601 obtains page P1, rasterizes page P1 to generate current page dot matrix X1.

(2) page P1 is a reference page; the variable data region extractor 602 stores the current page dot matrix X1 in the reference page memory 621 as a reference page dot matrix, the reference page dot matrix being represented by Xb.

(3) the separator 623 separates a portion ΔX1 of the current page dot matrix X1, which has different content from the reference page dot matrix Xb; because current page dot matrix X1 is the same with the reference page dot matrix Xb, ΔX1=NULL.

(4) variable data region extractor 602 transmits the dot matrix X1 of page P1 in the form of X1=Xb+NULL to the page outputting manager 603.

(5) the page outputting manager 603 outputs the dot matrix of page P1.

2. Page P2 is outputted by the following operations:

(1) the raster image processor 601 obtains page P2, rasterizes page P2 to generate current page dot matrix X2.

(2) Page P2 is not a reference page; the separator 623 separates a portion ΔX2 of the current page dot matrix X2, which has different content from the reference page dot matrix Xb, by the following specific steps:

2.1. determining that the reference page of current page P2 is P1, and the reference page dot matrix is Xb.

2.2. dividing the reference page dot matrix Xb and dot matrix X2 into 5952*5536/(32*16)=186*346=64356 blocks in a size of 32*16 pixels.

2.3. among the 64356 blocks of the current page dot matrix X2, identifying blocks having the same contents with corresponding blocks of the reference page dot matrix Xb and blocks having different contents from corresponding blocks of the reference page dot matrix Xb.

Figure 8:
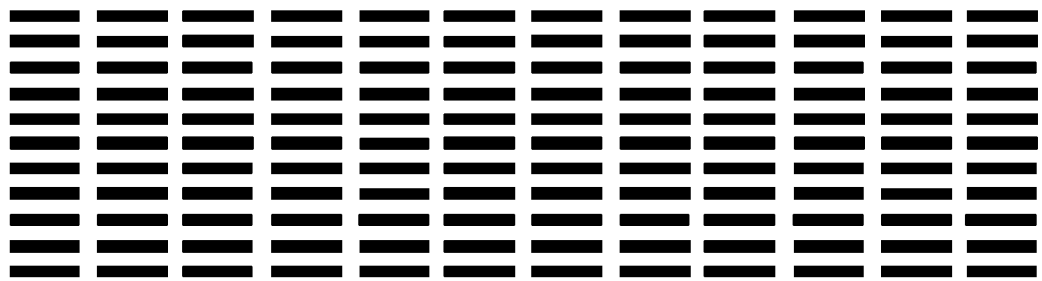
FIG. 8 is a schematic diagram of a Mask dot matrix according to an embodiment of this invention.

2.4. traversing the blocks of the current page dot matrix X2 to represent blocks having the same contents by 0x00 and represent blocks having different contents by 0xFF, and thereby generating a 64356-byte Mask dot matrix M2. Mask dot matrix M2 may be considered as a black-white dot matrix having a width of 186 and a height of 346. As shown in FIG. 8, the lower left point is the origin of coordinates.

Figure 9:
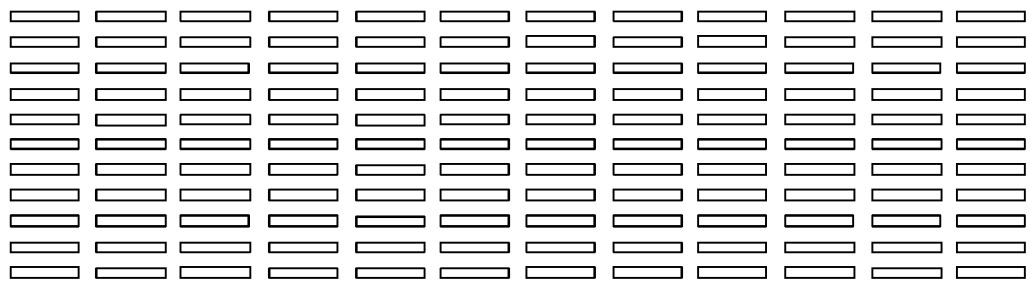
FIG. 9 is a schematic diagram of a set of rectangles extracted from connected components according to an embodiment of this invention.

2.5. extracting the rectangles of the connected components from Mask dot matrix M2 to form a set Gr of rectangles which includes 12*11=132 rectangles, as shown in FIG. 9.

Take the extraction of the first rectangle of connected components as an example: at first, Mask dot matrix M2 is scanned from left to right and from top to bottom, to find a first black point Po1, the position of which is [0,329]; then, with Po1 as a start point, connected components are extracted in a 8-adjacency manner. A bounding rectangle of these connected components is [0, 326, 494, 329].

2.6. The above joining, splitting and merging processes are performed iteratively on the set Gr.

First Loop:

1) joining the set Gr.

The set Gr does not include intersected or contained rectangles, so the set Gr remains unchanged.

2) counting densities of 132 rectangles in the set Gr, i.e., values RDi of different blocks/all blocks in the rectangles; the range of values of the RDi is 98% to 100%.

3) splitting rectangles having RDi<90%.

Because all rectangles have RDi>90%, it is not required to split any of the rectangles. The set Gr still has 132 rectangles.

4) Because 132>50, i.e., the number of rectangles in the set Gr is larger than a specified threshold Nt for the number of variable data blocks, it is necessary to perform a merging process on the set Gr. More specifically:

At first, the merging is performed on contiguous rectangles: because the 132 rectangles are separate from each other, no such contiguous merging is performed.

Next, the merging is performed on separate rectangles: a maximum bounding rectangle is seek for each of the 132 rectangles and rectangles on its upper, lower, left and right sides. A rectangle R12 is obtained by merging rectangles R1 and R2 having largest densities.

Second Loop:

The set Gr comprises 133 rectangles. During the joining process of the rectangle set, because R12 contains R1 and R2, Gr=Gr-R1-R2. However, during the subsequent merging process of the rectangle set, 132 rectangles are obtained.

Third Loop:

The set Gr comprises 131 rectangles.

Figure 10:
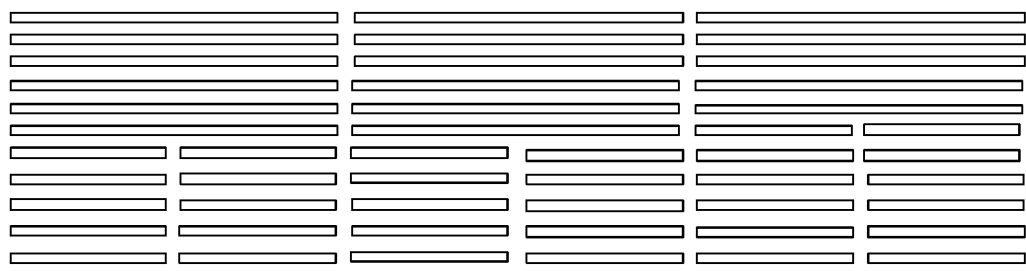
FIG. 10 is a schematic diagram of a finally determined set of rectangles according to an embodiment of this invention.

In similar way, after 85 loops, the set Gr comprises 49 rectangles, as shown in FIG. 10. ΔX2=content of dot matrix corresponding to the 49 rectangles.

(3) the variable data region extractor 602 transmits the dot matrix of page P2 to the page outputting manager 603 in the form of X2=Xb+ΔX2.

(4) the page outputting manager 603 outputs information of page P2.

The outputting process of subsequent pages P3 to P5000 is the same as the outputting process of page 2 as described above, which will not be repeated in detail herein.

Figure 11:
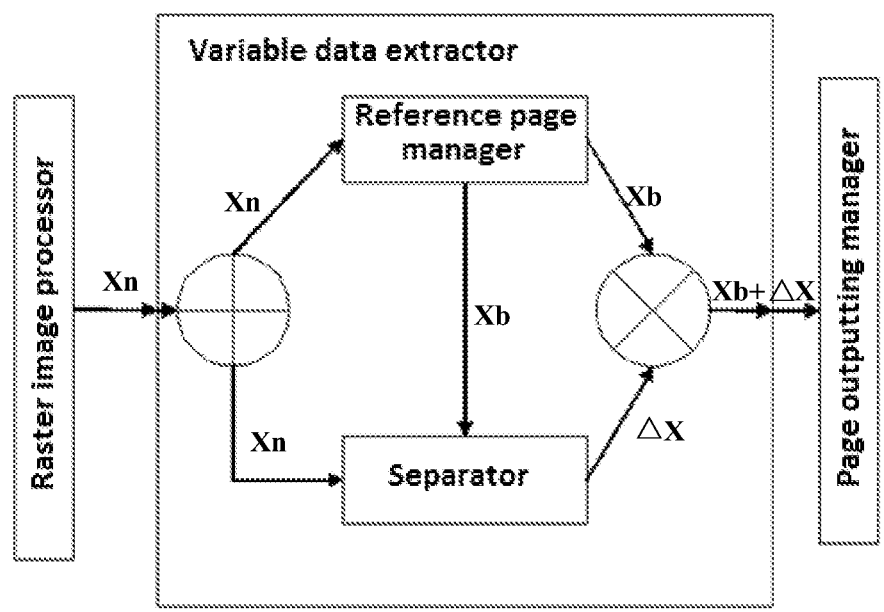
FIG. 11 is a schematic diagram of data flow according to an embodiment of this invention.

FIG. 11 shows data flow in the above procedure.

The embodiments in the present specification are described in a progressive manner. For the same or similar parts of various embodiments, reference may be made among the embodiments. Each embodiment focuses on the differences from other embodiments. Particularly, because the apparatus embodiments basically correspond to the method embodiments, reference can be made to the description of the method embodiments for relevant parts. The apparatus embodiments described above are merely illustrative, in which elements that are described as separated parts may be or may not be physically separated from each other, and those ones shown individually may be or may not be physical elements, which may be positioned at one position or may be distributed over multiple network units. Some or all modules thereof may be selected as required to realize the object of the embodiments of this invention as can be understood and implemented by those skilled in the art without any creative effort.

Respective parts in the embodiments of the present invention may be implemented in hardware, or as software modules running on one or more processors, or in a combination of hardware and software. Those skilled in the art will appreciate that a microprocessor or digital signal processor (DSP) may be used in practice to implement some or all of the functionalities of some or all of the parts in the page processing apparatus according to embodiments of the present invention.

This disclosure also provides one or more computer readable medium having stored thereon computer-executable instructions that when executed by a computer perform a page processing method for variable data printing, the method comprises: obtaining a current page of a file to be printed; performing a rasterization process on the current page to obtain a current page dot matrix; determining a reference page for the current page and obtaining a reference page dot matrix corresponding to the reference page; dividing the reference page dot matrix and the current page dot matrix into dot matrix blocks having a predetermined granularity according to fixed length and width values; identifying variable data blocks in the current page dot matrix based on the dot matrix blocks; dynamically adjusting the size of the variable data blocks; extracting a variable data dot matrix in the current page dot matrix with respect to the reference page dot matrix, according to the adjusted variable data blocks; splitting the current page dot matrix up into the reference page dot matrix and the variable data dot matrix and then storing and outputting them.

This disclosure also provides a computer with one or more computer readable medium having stored thereon computer-executable instructions that when executed by the computer perform the page processing method for variable data printing as described above.

Exemplary Operating Environment

The computer or computing device as described herein comprises hardware, including one or more processors or processing units, system memory and some types of computer readable media. By way of example and not limitation, computer readable media comprise computer storage media and communication media. Computer storage media comprises volatile or non-volatile, removable or non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may use one or more remote computers, such as logical connections to remote computers operated in a networked environment. Although various embodiments of the present disclosure are described in the context of the exemplary computing system environment, various embodiments of the present disclosure may be used with numerous other general purpose or application specific computing system environments or configurations. The computing system environment is not intended for limiting any aspect of the scope of use or functionality of the invention. In addition, the computer environment should not be interpreted as depending on or requiring any one or combination of components shown in the exemplary operating environment. Well-known examples of the computing systems, the environment and/or configurations suitable for all aspects of the present disclosure include, but are not limited to: personal computers, server computers, handheld or laptop devices, multiprocessor systems, microprocessor-based systems, set top boxes, programmable consumer electronics, mobile phone, network PC, minicomputers, mainframe computers, distributed computing environments including any one of the above systems or devices, and so on.

Various embodiments of the invention may be described in a general context of computer executable instructions such as program modules executed on one or more computers or other devices. The computer-executable instructions may be organized into one or more computer-executable components or modules as software. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

It is possible to carry out the method and apparatus of the present invention in many ways. For example, it is possible to carry out the method and apparatus of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

The embodiments of the present invention have been described in details above only by the way of examples and merely for the purpose of facilitating to understand the method and apparatus of the present invention. Those skilled in the art may make any modification and variation to the embodiments and applications of this invention according to the concept of the present invention, and such modifications and variations of the invention would be encompassed within the protection scope of the invention. In view of the foregoing, the contents of the specification should not be construed as limitations to the scope of the present invention which should be referred to the appended claims.

What is claimed is:

1. A page processing method for variable data printing, characterized in that the method comprises:
   obtaining a current page of a file to be printed;
   performing a rasterization process on the current page to obtain a current page dot matrix;
   determining a reference page for the current page and obtaining a reference page dot matrix corresponding to the reference page;

dividing the reference page dot matrix and the current page dot matrix into dot matrix blocks having a predetermined granularity according to fixed length and width values;

identifying variable data blocks in the current page dot matrix based on the dot matrix blocks;

dynamically adjusting the size of the variable data blocks;

extracting a variable data dot matrix in the current page dot matrix with respect to the reference page dot matrix, according to the adjusted variable data blocks;

splitting the current page dot matrix up into the reference page dot matrix and the variable data dot matrix and then storing and outputting them.

2. The method of claim 1, characterized by further comprising:

before determining a reference page for the current page, determining whether the current page is a reference page;

if the current page is a reference page, adding the current page into a reference page list as a reference page, and adopting the current page dot matrix as the reference page dot matrix and storing the reference page dot matrix in a reference page memory;

if the current page is not a reference page, executing the step of determining a reference page for the current page.

3. The method of claim 2, characterized in that the step of determining whether the current page is a reference page comprises:

obtaining a sequence number of the current page;

if the sequence number of the current page is the same as a sequence number of a predetermined reference page, determining that the current page is a reference page.

4. The method of claim 2, characterized in that the step of determining whether the current page is a reference page comprises:

if the current page is a first page, determining that the current page is a reference page;

if the current page is not a first page:

sequentially calculating a similarity between the current page and each reference page in the reference page list, using the current reference page as the reference page for the current page and ending the calculating, when a calculated similarity is larger than a predetermined threshold, determining the current page as a reference page, when all of the calculated similarities are less than the threshold.

5. The method of claim 1, characterized in that the step of identifying variable data blocks in the current page dot matrix based on the dot matrix blocks comprises:

identifying, in the current page dot matrix, dot matrix blocks having content different from corresponding blocks in the reference page dot matrix;

traversing the dot matrix blocks and generating a Mask dot matrix in which the variable data blocks in the current page dot matrix are identified in the form of a black-white dot matrix.

6. The method of claim 5, characterized in that the step of dynamically adjusting the size of the variable data blocks comprises:

sequentially extracting connected components from the Mask dot matrix and recording minimum bounding rectangles of the connected components to obtain a set of rectangles;

performing a joining process on rectangles in the set of rectangles to remove contained or intersected rectangles from the set of rectangles;

performing at least one of a splitting process and a merging process on the rectangles according to the number and densities of the rectangles obtained after the joining process.

7. The method of claim 6, characterized in that the step of performing a joining process on rectangles in the set of rectangles to remove contained or intersected rectangles comprises:

sorting the rectangles in the set of rectangles in descending order according to their areas and using a rectangle having the largest area as a reference rectangle;

sequentially comparing other rectangles with the reference rectangle respectively;

if the other rectangle is contained in the reference rectangle, removing this other rectangle;

if the other rectangle intersects with the reference rectangle, splitting one of the other rectangle and the reference rectangle, which has a smaller density.

8. The method of claim 6, characterized in that the step of performing at least one of a splitting process and a merging process on the rectangles according to the number and densities of the rectangles obtained after the joining process comprises:

counting densities of respective rectangles in the set of rectangles;

sequentially splitting rectangles having densities less than a specified density threshold so that all rectangles obtained after the splitting have densities larger than or equal to the density threshold;

counting the number of the rectangles in the set of rectangles;

if the number is larger than a specified threshold, expanding some of the rectangles in the set of rectangles so as to contain their adjacent rectangles, and then returning to execute the step of performing a joining process on rectangles in the set of rectangles.

9. A non-transitory machine-readable storage medium having stored thereon, at least one code section, the at least one code section being executable by a machine for causing the machine to perform acts of:

obtaining a current page of a file to be printed;

performing a rasterization process on the current page to obtain a current page dot matrix;

determining a reference page for the current page and obtaining a reference page dot matrix corresponding to the reference page;

dividing the reference page dot matrix and the current page dot matrix into dot matrix blocks having a predetermined granularity according to fixed length and width values;

identifying variable data blocks in the current page dot matrix based on the dot matrix blocks;

dynamically adjusting the size of the variable data blocks;

extracting a variable data dot matrix in the current page dot matrix with respect to the reference page dot matrix, according to the adjusted variable data blocks;

splitting the current page dot matrix up into the reference page dot matrix and the variable data dot matrix and then storing and outputting them.

10. The medium of claim 9, characterized in that the at least one code section is executable by a machine for causing the machine to further perform acts of:

before determining a reference page for the current page, determining whether the current page is a reference page; if the current page is a reference page, adding the current page into a reference page list as a reference page and adopting the current page dot matrix as the reference page dot matrix and storing the reference page dot matrix in a reference page memory; if the current page is not a reference page, determining a reference page for the current page.

11. The medium of claim 10, characterized in that the act of determining whether the current page is a reference page comprises: obtaining a sequence number of the current page, and determining that the current page is a reference page if the sequence number of the current page is the same as a sequence number of a predetermined reference page.

12. The medium of claim 10, characterized in that the act of determining whether the current page is a reference page comprises:

if the current page is a first page, determining that the current page is a reference page; and if the current page is not a first page:

sequentially calculating a similarity between the current page and each reference page in the reference page list, using the current reference page as the reference page for the current page and ending the calculating when a calculated similarity is larger than a predetermined threshold, and determining the current page as a reference page when all of the calculated similarities are less than the threshold.

13. The medium of claim 9, characterized in that the act of identifying variable data blocks in the current page dot matrix based on the dot matrix blocks comprises: identifying, in the current page dot matrix, dot matrix blocks having contents different from corresponding blocks in the reference page dot matrix; traversing the dot matrix blocks and generating a Mask dot matrix in which the variable data blocks in the current page dot matrix are identified in the form of a black-white dot matrix.

14. The medium of claim 13, characterized in that the act of dynamically adjusting the size of the variable data blocks comprises:

sequentially extracting connected components from the Mask dot matrix and recording minimum bounding rectangles of the connected components to obtain a set of rectangles;

performing a joining process on rectangles in the set of rectangles to remove contained or intersected rectangles from the set of rectangles;

performing at least one of a splitting process and a merging process on the rectangles according to the number and densities of the rectangles obtained after the joining process.

15. The medium of claim 14, characterized in that the act of performing a joining process on rectangles in the set of rectangles to remove contained or intersected rectangles comprises:

for sorting the rectangles in the set of rectangles in descending order according to their areas and using a rectangle having the largest area as a reference rectangle;

sequentially comparing other rectangles with the reference rectangle respectively; if the other rectangle is contained in the reference rectangle, removing this other rectangle; and if the other rectangle intersects with the reference rectangle, splitting one of the other rectangle and the reference rectangle, which has a smaller density.

16. The medium of claim 14, characterized in that the act of performing at least one of a splitting process and a merging process on the rectangles according to the number and densities of the rectangles obtained after the joining process comprises:

counting densities of respective rectangles in the set of rectangles;

sequentially splitting rectangles having densities less than a specified density threshold so that all rectangles obtained after splitting have densities larger than or equal to the density threshold;

counting the number of the rectangles in the set of rectangles;

an expanding unit for, if the number is larger than a specified threshold, expanding some of the rectangles in the set of rectangles so as to contain their adjacent rectangles, and then returning to perform a joining process on rectangles in the set of rectangles.

* * * * *